(12) United States Patent
Ma et al.

(10) Patent No.: US 8,588,387 B2
(45) Date of Patent: *Nov. 19, 2013

(54) METHOD AND APPARATUS FOR PROVIDING AN IDENTIFIER FOR A CALLER ID FUNCTION IN A TELECOMMUNICATION SYSTEM

(75) Inventors: Kevin Ka-yui Ma, North Brunswick, NJ (US); Art Wilton, East Windsor, NJ (US); Pasquale Villani, Freehold, NJ (US); Daniel Smires, Freehold, NJ (US); Michael South, Jackson, NJ (US); Zhiyu Guo, East Brunswick, NJ (US)

(73) Assignee: Vonage Network LLC, Holmdel, NJ (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/289,563

(22) Filed: Nov. 4, 2011

(65) Prior Publication Data

US 2012/0051267 A1 Mar. 1, 2012

Related U.S. Application Data

(63) Continuation of application No. 12/897,405, filed on Oct. 4, 2010, now Pat. No. 8,064,582.

(60) Provisional application No. 61/248,740, filed on Oct. 5, 2009.

(51) Int. Cl.
*H04M 15/06* (2006.01)
*H04M 1/56* (2006.01)

(52) U.S. Cl.
USPC ............. 379/142.09; 379/142.04; 379/142.06

(58) Field of Classification Search
USPC ............ 379/142.01, 142.06, 142.09, 142.17, 379/207.13, 207.14, 207.15, 352, 355.04, 379/355.06, 355.07, 355.09, 355.1, 373.01, 379/376.01; 370/352–356

See application file for complete search history.

(56) References Cited

U.S. PATENT DOCUMENTS 6,662,006 B2 * 12/2003 Glass ............................ 455/415
7,346,156 B1    3/2008 Choupak et al.
7,734,026 B2 *  6/2010 Daigle ..................... 379/142.03

(Continued)

FOREIGN PATENT DOCUMENTS

KR       10-0706486       4/2007
KR    10-2008-0084198    9/2008

OTHER PUBLICATIONS

International Search Report and Written Opinion dated Jun. 16, 2011 for PCT Application No. PCT/US2010/051320.

*Primary Examiner* — Binh Tieu
(74) *Attorney, Agent, or Firm* — Moser Taboada; Joseph Pagnotta

(57) ABSTRACT

Method, system, and computer readable medium for providing an identifier for a caller identifier (ID) function when processing a communication request between a calling party and a called party in a communication network is described. In some examples, an initial identifier for the caller ID function associated with the calling party is received. A determination is made if the calling party has a virtual identifier configured in the communication network. A determination is made if the called party has a predefined identifier associated with the calling party configured in the communication network. The initial identifier is replaced with a terminating identifier based on configuration of the virtual identifier and the predefined identifier in the communication network.

17 Claims, 5 Drawing Sheets

(56) References Cited

U.S. PATENT DOCUMENTS

| | | | |
|---|---|---|---|
| 2003/0147518 A1* | 8/2003 | Albal et al. | 379/207.15 |
| 2006/0188084 A1* | 8/2006 | Rogers et al. | 379/265.01 |
| 2007/0003036 A1* | 1/2007 | Daniels et al. | 379/142.01 |
| 2007/0105531 A1 | 5/2007 | Schroeder, Jr. | |
| 2008/0159501 A1* | 7/2008 | Cai | 379/142.05 |
| 2010/0303219 A1* | 12/2010 | Michaelis et al. | 379/93.23 |

* cited by examiner

| RECORD ID | KEY | | CONTACT NAME | CONTACT ILD NUMBER |
|---|---|---|---|---|
| | FROM NUMBER | DIRECT DIAL NUMBER | | |
| 1 | 1-609-XXX-XXXX | 1-732-123-0001 | UK-BUDDY | 44 888 777 9999 |
| 2 | 1-609-XXX-XXXX | 1-732-123-0002 | MEXICO-BUDDY | 52 97 81230888 |
| 3 | 1-609-XXX-XXXX | 1-732-123-0003 | FRANCE-BUDDY1 | 33 09 80 84 23 10 |
| 4 | 1-609-XXX-XXXX | 1-732-123-0004 | FRANCE-BUDDY2 | 33 09 44 12 50 30 |
| 5 | 33 09 44 12 50 30 | 33 09 12 30 00 10 | MON-AMI-US | 1-609-XXX-XXXX |
| ... | ... | ... | ... | ... |

FIG. 5

METHOD AND APPARATUS FOR PROVIDING AN IDENTIFIER FOR A CALLER ID FUNCTION IN A TELECOMMUNICATION SYSTEM

CROSS-REFERENCE TO RELATED APPLICATIONS

This application is a continuation of U.S. patent application Ser. No. 12/897,405 filed Oct. 4, 2010 now U.S. Pat. No. 8,064,582, which claims the benefit of U.S. Provisional Patent Application 61/248,740 filed Oct. 5, 2009, both of which are incorporated herein by reference in their entireties.

BACKGROUND OF THE INVENTION

1. Field of the Invention

The present invention relates generally to telecommunication systems and, more particularly, to a method and system for virtual number direct access dialing in a telecommunication system.

2. Description of the Related Art

Voice over IP (VoIP) is a technological development in the field of telecommunications that is utilized to transmit voice conversations over a data network using the Internet Protocol (IP). After a user subscribes to a VoIP service, the user can make phone calls to other VoIP subscribers or to public switched telephone network (PSTN) customers and access a number of features associated with the VoIP service, such as call waiting, three-way calling, call forwarding, voicemail service, and the like.

Telecommunication systems, including VoIP systems, typically distinguish between local telephone calls and long distance telephone calls. A long distance telephone call is one made outside of a defined area, such as outside a particular U.S. area code. In terms of dialing, local phone numbers are shorter than long distance phone numbers. For example, according to the North American Numbering Plan (NANP), a long distance telephone number includes a one-digit country calling code, a three-digit area code, a three-digit exchange code, and a four-digit number for a total of 11 digits. A local telephone number may include just the three-digit exchange code and the four-digit number for a total of 7 digits. An international long distance telephone number includes more than 11 digits, including an international access code (e.g., 011), a country code, and up to 13 additional digits. Dialing these many digits can be cumbersome and some contact or phone book applications associated with a user device may be ill-suited to accept international phone numbers.

Typically, the same service provider will serve all outgoing telephone calls, both local and long distance. Hence, a subscriber of a telephone service has little choice for long distance service other than that provided by the service provider. Further, a subscriber to a telephone service is assigned a particular telephone number. To call the subscriber, the calling party dials the assigned telephone number. If the subscriber decides to switch service providers and cannot port the previously assigned telephone number, the subscriber must update all interested parties with a new telephone number.

Generally, when a subscriber makes an outbound call, the subscriber cannot provide desired caller ID information as he has extremely limited control over same. For example, the subscriber may choose to either block or unblock whatever caller ID information may be available (by virtue of files maintained by the service provider or third party) and cannot select what caller ID information would be preferred based on the called party. This is particularly undesirable when placing international calls where one or both parties could be charged excessive communication fees based on long distance carrier rates, roaming charges and the like. Similarly, if the called party desires to call back the user, this operation would most likely be carried out based on the telephone number provided in the caller ID information. Such caller ID information would inconveniently result in a long distance call on the return path.

Accordingly, there exists a need in the art for a method and system for providing improved caller ID information in a telecommunication system that overcomes the disadvantages associated with incoming and outgoing long distance calls.

SUMMARY OF THE INVENTION

Method, system, and computer readable medium for providing an identifier for a caller identifier (ID) function when processing a communication request between a calling party and a called party in a communication network is described. In some embodiments, an initial identifier for the caller ID function associated with the calling party is received. A determination is made if the calling party has a virtual identifier configured in the communication network. A determination is made if the called party has a predefined identifier associated with the calling party configured in the communication network. The initial identifier is replaced with a terminating identifier based on configuration of the virtual identifier and the predefined identifier in the communication network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a diagram depicting a phonebook according to some embodiments of the invention.

DETAILED DESCRIPTION

Figure 1:
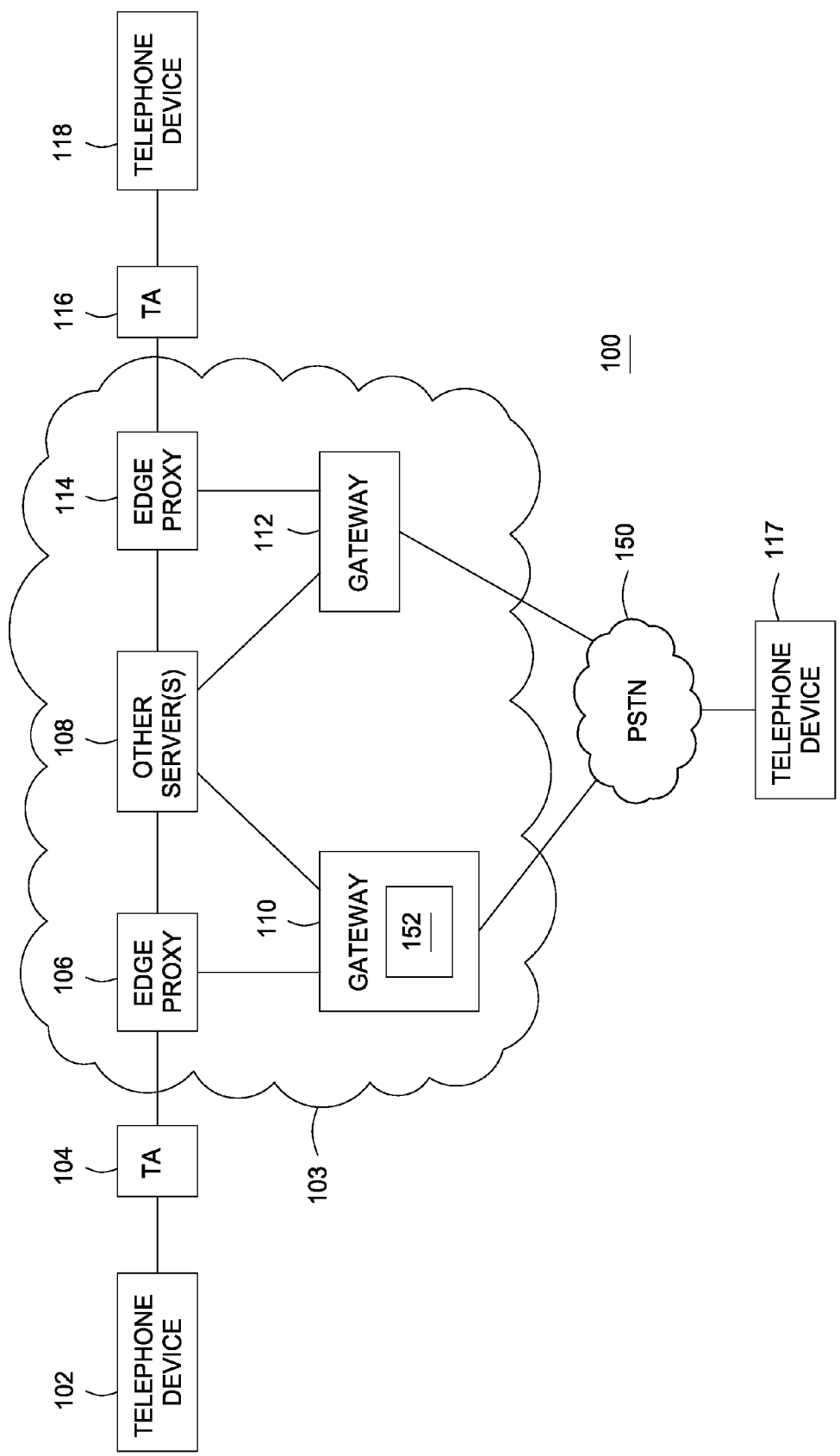
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The communication system 100 includes a packet network 103 (generally referred to as a telecommunication system), a first telephone device 102, a first terminal adapter 104, a second telephone device 118, a second terminal adapter 116, and a third telephone device 117. In one embodiment of the invention, the packet network 103 is a voice-over-internet-protocol (VOIP) network. Such a VOIP network 103 communicates information using internet protocol (IP) or like type network packet protocol. The terminal adapters 104 and 116 provide an interface between the respective telephones 102 and 118 and the VOIP network 103. The terminal adapters 104 may include modems, routers, switches, hubs, and like type network components to facilitate communication with the VOIP network 103. Each of the telephone devices 102 and 118 may be a packet-based device, such as an IP phone, or a circuit-based device, such as a conventional telephone. The third telephone device 117 is coupled to a publically switched telephone network (PSTN) 150. For purposes of clarity by example, the system 100 is shown with three telephone devices 102, 117, and 118. It is to be understood that the system may include more than three telephone devices.

The VOIP network 103 includes a first edge proxy server 106, one or more other servers 108, a first gateway server 110, a second gateway server 112, and a second edge proxy server 114. Each of the servers 106 through 114 may be physically implemented using one or more computer systems (an exemplary embodiment of a computer system is described below). The first edge proxy server 106 is configured for communication with the first terminal adapter 104. The first edge proxy server 106 performs functions of authenticating the first terminal adapter 104 and registering the first terminal adapter 104 with the VOIP network 103. Once registered, calls may be received from and sent to the first TA 104. In some embodiments, calls in the VOIP network 103 are facilitated using a multimedia control protocol, such as the Session Initiation Protocol (SIP) or like type multimedia protocols. To initiate a call, the first telephone device 102 communicates with the first TA 104. The first TA 104 sends an invitation message to the VOIP network 103 (e.g., a SIP INVITE message), which is received by the first edge proxy server 106. The first edge proxy 106 then passes the invitation message to another server, such as a server 108 and/or the first gateway server 110. For an incoming call, the first edge proxy server 106 receives an invitation message (e.g., a SIP INVITE message) from another server, such as a server 108 or the first gateway server 110. The first edge proxy server 106 then forwards the invitation message to the first TA 104.

The second edge proxy server 114 is configured for communication with the second terminal adapter 116. The second edge proxy server 114 performs the same functions as the first edge proxy server 106, but with respect to the second TA 116, the second telephone device 118, and the second gateway server 112.

The first and second gateway servers 110 and 112 are coupled to the PSTN 150. The first and second gateway servers 110 and 112 facilitate the routing of calls between the PSTN 150 and the VOIP network 103 (e.g., between the telephones 102 and 118 and the telephone 117). The other servers 108 may include various well known servers configured to facilitate VOIP services, such as provisioning servers, proxy servers, media relay servers, and the like.

The VOIP network 103 may also implement a caller identifier (ID) function for calls to and from the network. The caller ID function provides an identifier associated with the calling party to the called party. The identifier can include a telephone number, a name associated with the calling party, and the like. The identifier may also be referred to herein as "caller ID data." In some embodiments, the caller ID function provides an initial identifier for a call request from a calling party to a called party. The initial identifier may be the actual telephone number (as well as actual name) for the calling party. Depending upon configuration of virtual and/or direct dial identifiers in the VOIP network 103, the initial identifier of the caller ID function can be replaced with a terminating identifier, as described further below.

Embodiments of the invention relate to simplifying a user's dialing experience when making and receiving long distance telephone calls. As used herein, a long distance call is any call to a party having a telephone number outside of a local calling area. A local calling area can be a defined group of telephone numbers. For example, telephone numbers within an area code may be designated as part of the local calling area, and telephone numbers outside of such area code may be designated as part of a long distance calling area. In some embodiments, instead of dialing a long distance telephone number, another telephone number referred to as a "direct access dial number" or "direct access number" is dialed. The VOIP network 103 is configured such that the direct access dial number maps to a specific long distance telephone number. A user may be provisioned with several direct access dial numbers each for a different long distance telephone number. Thus, a user need only dial the direct access dial number for a particular long distance number rather than the long distance number itself. In some embodiments, the direct access dial number is a local telephone number for the user (i.e., part of the local calling area). Thus, a direct access number can have less digits than a long distance number (e.g., an international number), making it easier for a user to remember.

In some embodiments, a user is provisioned with a virtual telephone number that is mapped by the VOIP network 103 to the user's actual telephone number. A "virtual telephone number" is virtual in that the number is not actually provisioned for a particular telephone device of the user. Rather, a virtual telephone number is logically mapped to an actual telephone number assigned to a telephone device by the VOIP network 103. In some embodiments, when the user makes an outgoing call, the VOIP network 103 configures the calling number in caller identification (caller ID) data to be the user's virtual telephone number. The VOIP network 103 can also configure any other identification information in the caller ID data to be virtual identification information (e.g., a virtual name for the user's actual name). Thus, the called party will see caller ID data having the user's virtual telephone number (and other virtual information if configured), rather than the user's actual telephone number.

In some embodiments, when a user's virtual telephone number is dialed by a calling party, the VOIP network 103 looks for any pre-configured direct dial access numbers between the calling and called parties (as defined by the user). If the VOIP network 103 locates a match, the VOIP network 103 configures the caller ID data shown to the user to include the direct dial access number (and any other corresponding information). Thus, the user of the VOIP network 103 will see the direct access dial number instead of the calling party's actual telephone number. Since the user may have configured the direct access number, the user may more easily recognize the direct access number than the actual telephone number when the caller ID information for an incoming call is displayed.

In light of the embodiments discussed above, a user of the VOIP network 103 can make long distance calls from any telephone device registered with the VOIP network 103, such as a mobile phone, a landline phone, a computer, etc, regardless of the user's local telephone service. For example, a user may receive local telephone service from the PSTN, while having long distance service from the VOIP provider. The user can share their virtual telephone number with their friends, family, etc, instead of the actual telephone number assigned to their device (e.g., a telephone number assigned by the PSTN). Thus, if a user switches telephone service and ends up with a different actual telephone number, the switch is seamless to their friends, family, etc. The user need only update the mapping between their actual number and the virtual number in the VOIP network.

Implementation of the above-described embodiments may be obtained using one or more servers in the VOIP network 103. In some embodiments, logic to implement the above-described embodiments is implemented within a gateway server to the PSTN 150, such as the first and second gateway servers 110 and 112. It is to be understood that the logic described herein may be implemented in any server, including any other stand-alone server dedicated to this specific purpose.

In some embodiments, a user sets up a phonebook with the VOIP network 103. For example, assume the first gateway server 110 maintains a phonebook 152 for a user of the telephone 102. The phonebook includes mappings between direct dial numbers and actual telephone numbers (e.g., actual long distance numbers). For example, a direct dial number of 1-732-555-0001 can be mapped to a long distance number 44-888-777-9999. Generally, a direct dial number is a predefined identifier associated with a specific party. The phonebook may also include a contact name associated with each mapping. The user can dial a direct dial number to place a call to an actual telephone number mapped to the direct dial number. When the gateway server (or other server) receives a call to the direct dial number, the server accesses the phonebook to obtain the actual telephone number to which the call should be routed.

FIG. 5 is a diagram depicting a phonebook 500 according to some embodiments of the invention. The phonebook 500 has a format defined by a record column 502, a key column 504, a contact name column 506, and a contact number column 508. The key column 504 includes a from number column 512 and a direct dial number column 514. The phonebook 500 includes a plurality of entries 510. Each entry includes a record number in the record column 502, a telephone number in the from number column 512, a telephone number in the direct dial number column 514, a name in the contact name column 506, and a telephone number in the contact number column 508. Each entry 510 essentially maps a direct dial number to a contact name and actual telephone number. Those skilled in the art will appreciate that the phonebook 500 is merely exemplary and can have other formats for mapping a direct dial number to an actual telephone number.

Figure 2:
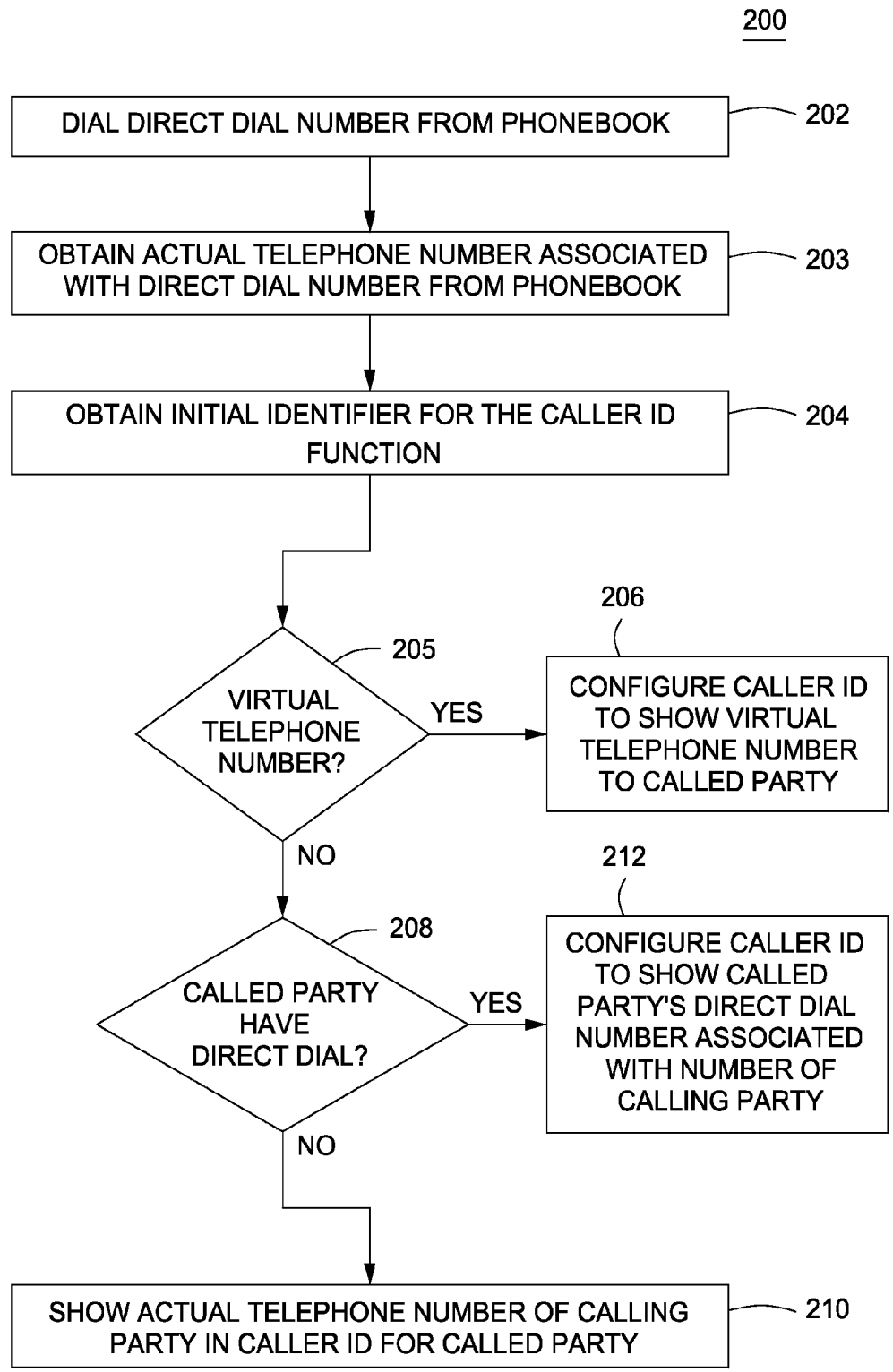
FIG. 2 is a flow diagram depicting a method of handling caller ID of an outgoing call according to some embodiments of the invention.

FIG. 2 is a flow diagram depicting a method 200 of handling caller ID data for an outgoing call according to some embodiments of the invention. The method 200 may be performed by a gateway server in the VOIP network 103 or any other server. In the method 200, it is assumed the user is the calling party placing a call to a called party. The telephone device of the called party can be attached to the PSTN or to the VOIP network. A placed call by a calling party may also be referred to as a "communication request."

The method 200 begins at step 202, where a user dials a direct dial number that is part of a phonebook maintained by the VOIP network. At step 203, an actual telephone number is obtained from the phonebook that is associated with the direct dial number. At step 204, an initial identifier is obtained for the caller ID function associated with the user (e.g., the user's actual telephone number, name, etc). At step 205, a determination is made whether the user has a relevant virtual telephone number. Notably, the user may have a single virtual telephone number or different virtual telephone numbers for different countries. If the user has a single virtual telephone number or has a virtual telephone number for a country to which the telephone call is destined (based on the actual telephone number), the method 200 proceeds to step 206. At step 206, the caller ID data for the call is configured to include the user's relevant virtual telephone number (the initial identifier is replaced with the virtual telephone number). That is, the called party will see the user's relevant virtual telephone number rather than the user's actual telephone number. The caller ID data may include other information, such as a name associated with the calling party.

If at step 205 the user does not have a relevant virtual telephone number, the method 200 proceeds to step 208. At step 208, a determination is made whether the called party has direct dial number(s) in a phonebook setup with the VOIP network. If not, the method 200 proceeds to step 210, where the caller ID data is configured to include a predefined telephone number. In some embodiments, the predefined telephone number can be the user's actual telephone number (i.e., the initial identifier is not changed). In other embodiments, the VoIP provider may assign the user a telephone number different than the user's actual telephone number (e.g., a default number). This assigned telephone number may be referred to herein as a local personal assigned telephone number. The predefined telephone number at step 210 may be the user's local personal assigned telephone number.

If at step 208 the called party includes a direct dial number associated with the user's telephone number, the method 200 proceeds to step 212. At step 212, the caller ID data for the call is configured to show the user's corresponding direct dial number as set by the called party in their phonebook (the initial identifier is replaced with the corresponding direct dial number). That is, if the called party has setup a direct dial number for the user (calling party), then this direct dial number is included in the caller ID data when receiving a call from the user (calling party), rather than the user's actual telephone number.

As described above, the method 200 first checks if the user has a relevant virtual telephone number and then, in absence of such virtual telephone number, checks whether the called party has direct dial number(s) in a phonebook. In another embodiment, steps 205 and 208 can be switched (i.e., the check at 208 can be performed before the check at 205). The order of the checks at 205 and 208 can be changed based on preferences of the VoIP provider and/or user.

Figure 3:
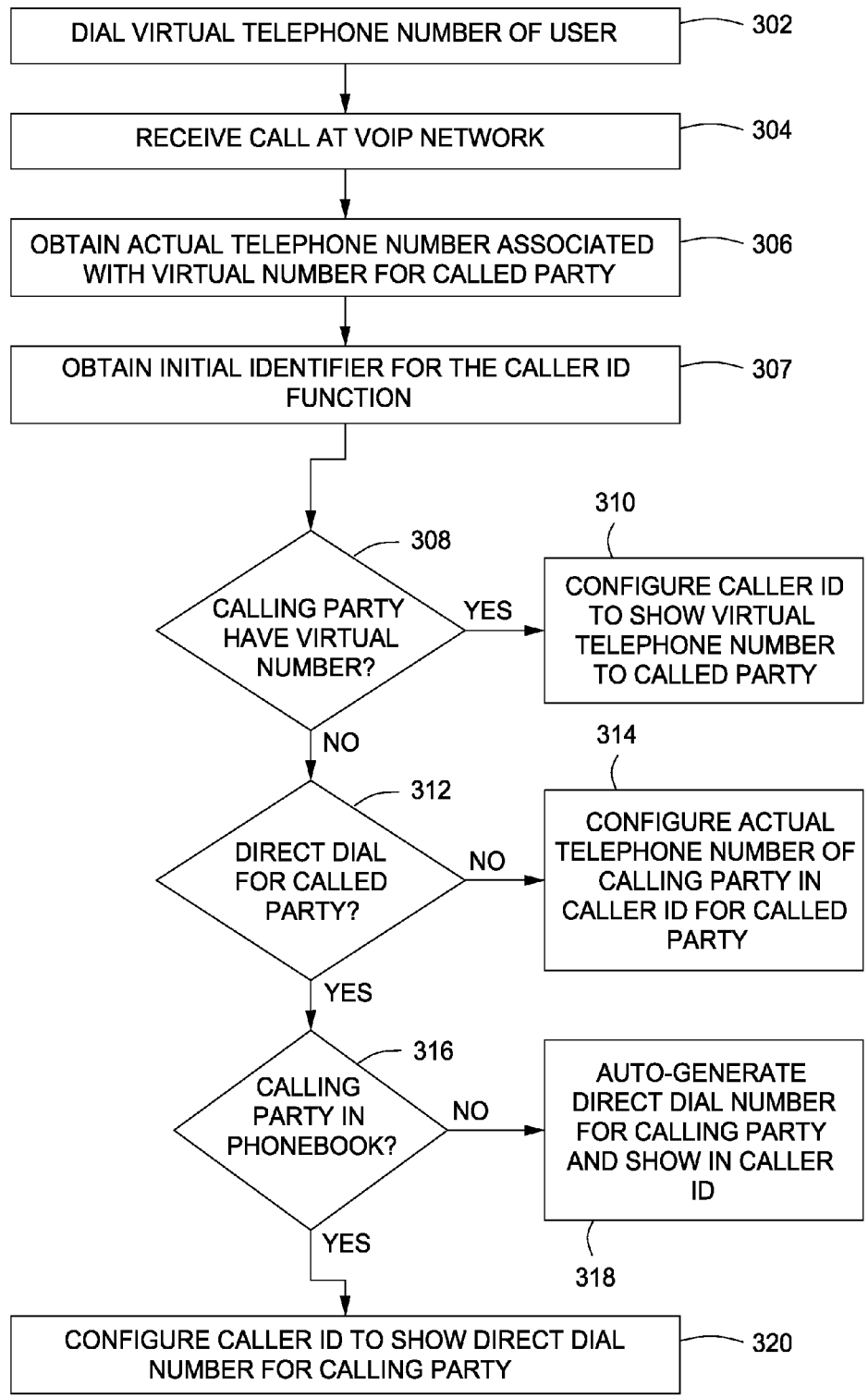
FIG. 3 is a flow diagram depicting a method of handling caller ID of an incoming call according to some embodiments of the invention.

FIG. 3 is a flow diagram depicting a method 300 of handling caller ID data of an incoming call according to some embodiments of the invention. The method 300 may be performed by a gateway server in the VOIP network 103 or any other server. In the method 300, it is assumed the user is the called party receiving a call from a calling party. The telephone device of the calling party can be attached to the PSTN or to the VOIP network.

The method 300 begins at step 302, where a calling party dials a virtual telephone number of a user of the VOIP network. At step 304, the call is received by the VOIP network (e.g., by a gateway server or other server). At step 306, an actual telephone number is obtained for the virtual telephone number. At step 307, an initial identifier is obtained for the caller ID function (e.g., an actual telephone number of the calling party). At step 308, a determination is made whether the calling party has a relevant virtual telephone number. If so, the method 300 proceeds to step 310, where the caller ID data is configured to include the relevant virtual telephone number of the calling party (the initial identifier is replaced with the virtual telephone number). That is, the user (called party) sees the relevant virtual number of the calling party, rather than the actual telephone number of the calling party.

If at step 308 the calling party does not have a relevant virtual telephone number, the method 300 proceeds to step 312. At step 312, a determination is made whether the user has a direct dial phonebook setup with the VOIP network. If not, the method 300 proceeds to step 314, where the caller ID data is configured to include a predefined telephone number. In some embodiments, the predefined telephone number is the calling party's actual telephone number. In other embodiments, the predefined telephone number may be a number assigned to the calling party by the VoIP provider or other service provider that is other than the actual telephone number (e.g., a default number).

If at step 312 the user has a direct dial phonebook setup, the method 300 proceeds to step 316. At step 316, a determination is made whether the calling party is in the user's direct dial phonebook. If not, the method 300 proceeds to step 318, where a direct dial number can be auto-generated for the calling party's actual telephone number and included in the caller ID data displayed the user (the initial identifier is replaced with the auto-generated number). If the user's phonebook includes an entry for the calling party's telephone number, the method proceeds from step 316 to step 320. At step 320, the caller ID data is configured to include the direct dial number that matches the calling party's telephone number (the initial identifier is replaced with the direct dial number).

As described above, the method 300 first checks if the calling party has a relevant virtual telephone number and then, in absence of such virtual telephone number, checks whether the user has direct dial number(s) in a phonebook. In another embodiment, steps 308 and 312-320 can be switched (i.e., the steps 312-320 can be performed before the check at 308). The order of the checks at 308 and 312 can be changed based on preferences of the VoIP provider and/or user.

Figure 4:
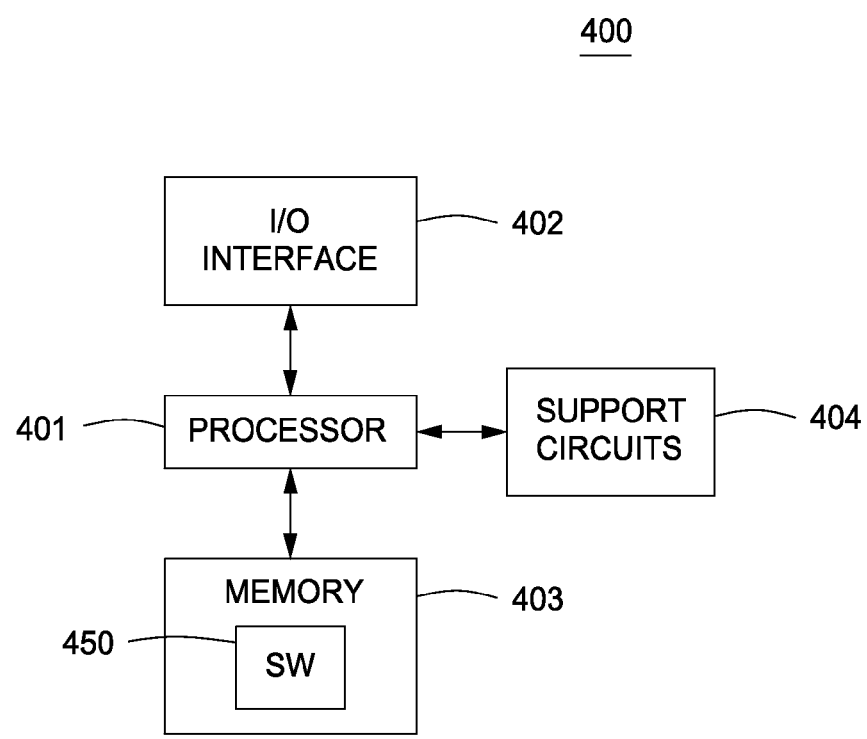
FIG. 4 is a block diagram depicting an exemplary embodiment of a computer in accordance with one or more aspects of the invention.

FIG. 4 is a block diagram depicting an exemplary embodiment of a computer 400 in accordance with one or more aspects of the invention. The computer 400 or multiple ones of the computer 400 may be used to implement the any of the servers and/or methods described herein. The computer 400 may be one of any form of a general purpose computer used in accessing and operating within an IP-based network. The computer 400 may include a processor 401, a memory 403, various support circuits 404, and an I/O interface 402. The processor 401 may include one or more microprocessors or the like known in the art. The support circuits 404 include conventional cache, power supplies, clock circuits, data registers, and the like. The I/O interface 402 is configured for communication with the VOIP network 103. The memory 403, or computer readable medium, may include one or more of the following random access memory, read only memory, magneto-resistive read/write memory, optical read/write memory, cache memory, magnetic read/write memory, and the like.

The memory 403 may store software 450 that is executed to perform methods of according to embodiments of the invention. For example, the software 450 can implement at least a portion of the methods 200 and 300 performed by a gateway server or other server in the VOIP network 103. The software 450, when executed by the processor 401, transforms the general purpose computer into a specific purpose computer that controls methods described herein. Although embodiments of the process of the present invention are discussed as being implemented as a software routine, some of the method steps that are disclosed herein may be performed in hardware or a combination of hardware and software. As such, the invention may be implemented in software as executed upon a computer system, in hardware as an application specific integrated circuit or other type of hardware implementation, or a combination of software and hardware.

Additionally, the software 450 may act as a "stand alone" program or may be embedded with one or more other routines or programs that provide one or more additional telecommunication services. The software 450 of the present invention is capable of being executed on computer operating systems including but not limited to Microsoft Windows 98, Microsoft Windows XP, Apple OS X and Linux. Similarly, the software 450 of the present invention is capable of being performed using CPU architectures including but not limited to Apple Power PC, AMD/Intel x86, Sun SPARC, and Intel ARM.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for providing an identifier for a caller identifier (ID) function when processing a communication request between a calling party and a called party in a communication network comprising:
   receiving an initial identifier for the calling party;
   determining at least two mappings of the initial identifier to one or more alternate identifiers;
   providing, in caller ID information, a terminating identifier for identifying the calling party based on results of the at least two mappings, wherein the terminating identifier is determined based upon a direct dial phonebook associated with the called party; and
   determining that the terminating identifier is a direct dial identifier when the initial identifier of the calling party is found in the direct dial phonebook.

2. The method of claim 1, wherein the direct dial phonebook associated with the called party is retrieved from the communication network of the called party.

3. A method for providing an identifier for a caller identifier (ID) function when processing a communication request between a calling party and a called party in a communication network comprising:
   receiving an initial identifier for the calling party;
   determining at least two mappings of the initial identifier to one or more alternate identifiers;
   providing, in caller ID information, a terminating identifier for identifying the calling party based on the results of the at least two mappings, wherein the terminating identifier is determined based upon a direct dial phonebook associated with the called party; and
   determining that the terminating identifier is an automatically generated identifier when the initial identifier of the calling party is not found in the direct dial phonebook.

4. The method of claim 1, wherein the direct dial phonebook for the called party associates the initial identifier of the calling party, a direct dial identifier of the calling party, a contact name of the calling party, and an actual identifier of the calling party in a record and the direct dial phonebook is maintained by the communication network.

5. The method of claim 1 wherein the communication network is a voice over internet protocol (VOIP) network.

6. The method claim 5 wherein the called party is associated with a device coupled to the VOIP network.

7. The method of claim 1 wherein at least part of the communication network is a public switched telephone network (PSTN).

8. The method of claim 7 wherein the called party is associated with a device coupled to the PSTN network.

9. A system for providing an identifier for a caller identifier (ID) function when processing a communication request between a calling party and a called party in a communication network, comprising:
- a) at least one processor;
- b) at least one input device; and
- c) at least one storage device storing processor-executable instructions which, when executed by the at least one processor, performs a method including:

receiving an initial identifier for the calling party;

determining at least two mappings of the initial identifier to one or more alternate identifiers;

providing, in caller ID information, a terminating identifier for identifying the calling party based on results of the at least two mappings, wherein the terminating identifier is determined based upon a direct dial phonebook associated with the called party; and determining that the terminating identifier is a direct dial identifier when the initial identifier of the calling party is found in the direct dial phonebook.

10. The system of claim 9, wherein the direct dial phonebook associated with the called party retrieved from the communication network of the called party.

11. The system of claim 9, further comprising determining that the terminating identifier is an automatically generated identifier when the initial identifier of the calling party is not found in the direct dial phonebook.

12. The system of claim 9 wherein the direct dial phonebook for the called party associates the initial identifier of the calling party, a direct dial identifier of the calling party, a contact name of the calling party, and an actual identifier of the calling party in a record and the direct dial phonebook is maintained by the communication network.

13. The system of claim 9 wherein the communication network is a voice over internet protocol (VOIP) network.

14. The system claim 13 wherein the called party is associated with a device coupled to the VOIP network.

15. The system of claim 9 wherein at least a part of the communication network is a public switched telephone network (PSTN).

16. The system of claim 15 wherein the called party is associated with a device coupled to the PSTN network.

17. A non-transitory computer readable medium having stored thereon instructions that when executed by a processor cause the processor to perform a method of providing an identifier for a caller identifier (ID) function when processing a communication request between a calling party and a called party in a communication network, comprising:

receiving an initial identifier for the calling party;

determining at least two mappings of the initial identifier to one or more alternate identifiers; and providing, in caller ID information, a terminating identifier for identifying the calling party based on results of the at least two mappings, wherein the terminating identifier is determined based upon a direct dial phonebook associated with the called party; and determining that the terminating identifier is a direct dial identifier when the initial identifier of the calling party is found in the direct dial phonebook.

* * * * *